United States Patent
Bar-Yam (10) Patent No.: US 10,191,956 B2
(45) Date of Patent: Jan. 29, 2019

(54) EVENT DETECTION AND CHARACTERIZATION IN BIG DATA STREAMS

(71) Applicant: NEW ENGLAND COMPLEX SYSTEMS INSTITUTE, INC., Cambridge, MA (US)

(72) Inventor: Yaneer Bar-Yam, Cambridge, MA (US)

(73) Assignee: New England Complex Systems Institute, Inc., Cambridge, MA (US)

( * ) Notice: Subject to any disclaimer, the term of this patent is extended or adjusted under 35 U.S.C. 154(b) by 551 days.

(21) Appl. No.: 14/830,425

(22) Filed: Aug. 19, 2015

(65) Prior Publication Data

US 2016/0055190 A1 Feb. 25, 2016

Related U.S. Application Data

(60) Provisional application No. 62/039,408, filed on Aug. 19, 2014.

(51) Int. Cl.
*G06F 17/30* (2006.01)

(52) U.S. Cl.
CPC .. *G06F 17/30572* (2013.01); *G06F 17/30324* (2013.01)

(58) Field of Classification Search
CPC ............................................... G06F 17/30324
USPC ...................................................... 707/693
See application file for complete search history.

(56) References Cited

U.S. PATENT DOCUMENTS

| | | | |
|---|---|---|---|
| 6,920,450 B2 | 7/2005 | Aono et al. | |
| 6,990,238 B1 | 1/2006 | Saffer et al. | |
| 7,739,284 B2 | 6/2010 | Aggarwal et al. | |
| 8,145,638 B2 | 3/2012 | Mount et al. | |
| 9,009,157 B2 | 4/2015 | Jin et al. | |
| 9,076,156 B2 | 7/2015 | Newnham et al. | |
| 2011/0091073 A1* | 4/2011 | Iwasaki | G06T 7/215 382/103 |
| 2011/0251875 A1* | 10/2011 | Cosman | G06Q 10/087 705/7.31 |
| 2011/0286628 A1* | 11/2011 | Goncalves | G06F 17/30256 382/103 |

OTHER PUBLICATIONS

C. Aggarwal, J. Wolf, P. Yu, C. Procopiuc, J. Park, Fast Algorithms for Projected Clustering, ACM SIGMOD Record, vol. 28, Issue 2, Jun. 1999, pp. 61-72.
V. Misra, D. Harmon, Y. Bar-Yam, Vulnerability Analysis of High Dimensional Complex Systems, Stabilization, Safety, and Security of Distributed Systems Lecture Notes in Computer Science, vol. 6366, pp. 560-572, 2010.

* cited by examiner

*Primary Examiner* — Hanh B Thai
(74) *Attorney, Agent, or Firm* — Quarles & Brady LLP (57) ABSTRACT

Methods, systems, and apparatus, including computing device programs encoded on computing device storage media, for characterizing events in a data stream. In one of the methods a General Method, is used to construct a Specific Method, which performs the characterization of behavioral types of a particular system or set of systems. The Specific Method includes event extraction, dimensional reduction, and signature identification in the reduced dimensional space that map the events of a specific system into behavioral types.

20 Claims, 3 Drawing Sheets

EVENT DETECTION AND CHARACTERIZATION IN BIG DATA STREAMS

CROSS-REFERENCE TO RELATED APPLICATIONS

This application is a non-provisional and claims the benefit of U.S. Pat. App. Ser. No. 62/039,408, entitled "Event Detection and Characterization in Big Data Streams," filed Aug. 19, 2014, and incorporated herein in its entirety by reference.

BACKGROUND

Large amounts of data are becoming available due to the ease of sharing information over the Internet and due to the development of a wide variety of sensors that provide information about individuals, society and technological systems. The importance of using this information to understand the behavior of a wide variety of systems is growing. Among the opportunities is improved understanding of failures and risk of failures, attacks on the system by malicious actors, and more generally the characterization of events. Characterizing events that occur in a system can enable us to better respond to those events and to change the system to make it less vulnerable to adverse events.

Existing methods of analyzing data streams and determining the existence of adverse events and characterizing those events generally depend on human identified specific measures for those events determined by logic, or specific identification of particular types of events obtained from analysis of preexisting instances of those specific events. For example events associated with security breaches are analyzed by using, for example, parts of the code of a particular malware, or presence of a particular file in the system. Vulnerability of a computing device system is determined by the settings of the system compared with recommended settings. Adverse health related events are obtained by identifying specific indicators of those health related events.

A typical data management approach is to organize related data values into a simple data structure, such as a multi-dimensional vector in which each data value is assigned to one of the dimensions of the vector. As a system becomes more and more digitally integrated with other systems, observation devices, and data flows, the amount of data generated by the system increases and additional data values become available for the purpose of characterizing the system or the data produced by it. In a complex system, vectors quickly become extremely difficult or impossible for human beings to process as the number of dimensions increases: effective visualization of a vector can only be achieved at very low (i.e., two or three) dimensions, so conventional solutions that rely on the ability of human observers to infer and characterize the nature of the event are deficient. It is common to attempt to characterize systems using methods that are fully specified algorithimically by an individual who determines the process of signature extraction from data vectors. For example, the observer must individually identify, characterize, and program each signature that is to be used to characterize events. These measures are not robust to the many possible ways that events, adverse events, vulnerability, failures, and security breaches can occur. There is need for a more general ability to recognize when a system is vulnerable, failing, or when a system has been compromised. More generally, there is a need for methods to extract various signatures characterizing events from large amounts of data.

SUMMARY

Embodiments of the invention significantly overcome such deficiencies, and provide mechanisms and techniques whereby signatures of different types of events are extracted and then applied to the determination of the types of ongoing behavior of a system, or multiple systems. The types of events that can be characterized include but are not limited to adverse events, anomalous events, vulnerabilities, failures of a system, and security breaches.

In one embodiment, the disclosure provides a system including a computing device configured to obtain a plurality of vectors comprising data from a data stream, each of the plurality of vectors having a plurality of dimensions. The system further includes a dimensional reduction module installed on the computing device and configuring the computing device to generate a low dimensional space defined by a plurality of reduced vectors, each reduced vector of the plurality of reduced vectors having: a corresponding vector of the plurality of vectors; and, a plurality of reduced dimensions each containing or associated with a value obtained by applying a dimensional reduction algorithm to the data of the corresponding vector. The system further includes a partitioning module installed on the computing device and configuring the computing device to partition the low dimensional space into a plurality of regions, each region containing a subset of the reduced vectors and being associated with a characteristic determined from the data of the one or more vectors that correspond to the one or more reduced vectors in the subset of the region. The partitioning module further configures the computing device to associate a label with each of the plurality of regions, the label identifying the characteristic of each of the plurality of regions.

The computing device may be further configured to obtain a new vector containing new data not wholly included in the data of the plurality of vectors; the dimensional reduction module may further configures the computing device to map, with the dimensional reduction algorithm, the new vector onto a corresponding reduced new vector having a location in the low dimensional space. The system may further include an output module installed on the computing device and configuring the computing device to receive a determination of the region that contains the location, and output the label of the region that contains the location. One or more of the regions may be labeled as an anomalous region, and the output module may further configure the computing device to output an alert if the location is in one of the anomalous regions. Each vector of the plurality of vectors may corresponds to an individual in a population, each dimension of the plurality of dimensions may represent a corresponding health property of a plurality of health properties, and, for each reduced vector, the value of each reduced dimension may be a combined measure determined from two or more of the plurality of dimensions of the corresponding vector.

In another embodiment, the present disclosure provides a system including a computing device configured to obtain a vector space defined by a plurality of reduced vectors, each reduced vector being a dimensional reduction of a corresponding vector of a plurality of vectors, the corresponding vector containing data from a data stream. The system further includes a partitioning module installed on the computing device and configuring the computing device to partition the vector space into a plurality of regions, each region containing a subset of the reduced vectors and being associated with a characteristic determined from the data in the one or more vectors that correspond to the one or more reduced vectors in the subset of the region. The partitioning module may use a pre-set criterion or a pre-set algorithm to partition the vector space. The system may further include a dimensional reduction module installed on the computing device and configuring the computing device to map, with a dimensional reduction algorithm, each vector to a corresponding reduced vector of the plurality of reduced vectors to generate the vector space and a set of reduced dimensions for the vector space and the plurality of reduced vectors. The dimensional reduction algorithm may be selected from the group comprising: aggregation, correlation, multidimensional scaling, principal component analysis, Sammon map, clustering, projection onto a subspace, self-organizing map, and multiscale analysis.

The partitioning module may further configure the computing device to associate a label with each of the plurality of regions, the label identifying the characteristic of each of the plurality of regions. At least one of the plurality of regions may be labeled normal and at least one of the plurality of regions may be labeled anomalous. The data stream may contain activity of a monitored computing device, and the regions labeled anomalous may correspond to a security breach of the monitored computing device. The label of each of the plurality of regions may identify a corresponding behavior of a set of behaviors. The label of each of the plurality of regions may be provided by an expert of a topic of the data in the data stream. The partitioning module may further configure the computing device to map a continuum of values onto the low dimensional space, the continuum setting a value at each location of part of the low dimensional space, the value being determined by the location.

The system may further include an interface module installed on the computing device and configuring the computing device to generate an interface accessible by a user device in electronic communication with the computing device, and to receive the label of each region of the plurality of regions from the user device via the interface. The interface module may further configure the computing device to transmit the vector space showing the plurality of regions and the plurality of reduced vectors to the user device via the interface before receiving the labels. The computing device may be further configured to: obtain a new vector containing new data that entered the data stream subsequent to the computing device obtaining the plurality of vectors; map, with a dimensional reduction algorithm, the new vector onto a corresponding reduced new vector having a location in the low dimensional space; and determine the region that contains the location.

In another embodiment, the present disclosure provides a method for analyzing a data stream. The method includes: obtaining a plurality of vectors comprising data from the data stream, each of the plurality of vectors having a plurality of dimensions; mapping, with a dimensional reduction algorithm, each vector of the plurality of vectors onto a corresponding reduced vector of a plurality of reduced vectors in a low dimensional space, the low dimensional space having a plurality of reduced dimensions numbering fewer than the plurality of dimensions; partitioning the low dimensional space into a plurality of regions, each region containing a subset of the reduced vectors and being associated with a characteristic determined from the data in the one or more vectors that correspond to the one or more reduced vectors in the subset of the region; and, associating a label with each of the plurality of regions in the low dimensional space. The method may further include: obtaining a new vector comprising new data from the data stream; mapping, with the dimensional reduction algorithm, the new vector onto a corresponding reduced new vector having a location in the low dimensional space; determining the region that contains the location; and, outputting the label of the region that contains the location. The method may further include identifying an event in the data stream, wherein the new data entered the data stream within an interval of time of the event.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention.

The following description refers to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled"

means that one element/feature is directly or indirectly coupled to another element/feature, and not necessarily mechanically, such as when elements or features are embodied in program code. Thus, although the figures depict example arrangements of processing elements, additional intervening elements, devices, features, components, or code may be present in an actual embodiment.

The invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, diodes, look-up tables, etc., which may carry out a variety of functions under the control of one or more microprocessors or other control devices. Other embodiments may employ program code, or code in combination with other circuit components.

In accordance with the practices of persons skilled in the art of computer programming, the present disclosure may be described herein with reference to symbolic representations of operations that may be performed by various computing components, modules, or devices. Such operations may be referred to as being computer-executed, computerized, software-implemented, or computer-implemented. It will be appreciated that operations that can be symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

As non-limiting examples unless specifically indicated, any database or data store described herein may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future. File systems for file or database storage may be any file system, including without limitation disk or shared disk, flash, tape, database, transactional, and network file systems, using UNIX, Linux, Mac OS X, Windows FAT or NTFS, FreeBSD, or any other operating system.

The various aspects of the invention will be described in connection with configuring systems to perform partitioning of a low dimensional space determined by dimensional reduction of a large data set. That is because the features and advantages that arise due to the invention are well suited to this purpose. However, it should be appreciated that the invention is applicable to other procedures and to achieve other objectives as well.

The approach of the invention to determining signatures makes use of a high level subdivision neuromorphic architecture to provide event detection and characterization. The system performing the detection of events is optimized to characterize the difference between types of events based upon dimensional reduction to partition the behavior of the system without a predetermined definition of those types, including such categories as normal and abnormal events.

(In the prior art, we note, for example, that U.S. Pat. No. 6,177,885 makes essential use of an "established set" of parameters for normal and abnormal traffic patterns to detect anomalies in traffic, which the current approach does not rely upon as a general rule, though the present method may be augmented by special knowledge such as established parameters or expert knowledge where it is available and useful to do so.). Moreover, unlike the prior art of general unsupervised learning algorithms that partition pre-specified data sets, the present systems and methods partition the low dimensional space itself, so as to enable characterization of events that take place in the future as well as intermediate cases between normal and adverse that enable characterizing vulnerability and provide information about how to change the system to prevent adverse events. In each case, characterization does not require prior events that are very similar to the new event.

The approach of the invention is to provide a method, the General Method, that can be used to generate a characterization scheme for any data stream. The generated characterization scheme may underpin another method, the Specific Method, which may perform a characterization of behavioral types, events, populations, devices, and the like, in a particular system, or multiple systems. The specific method for characterization may be incorporated in a computing device for execution of the characterization of events of a specific system, or multiple systems, into behavioral types.

Figure 1:
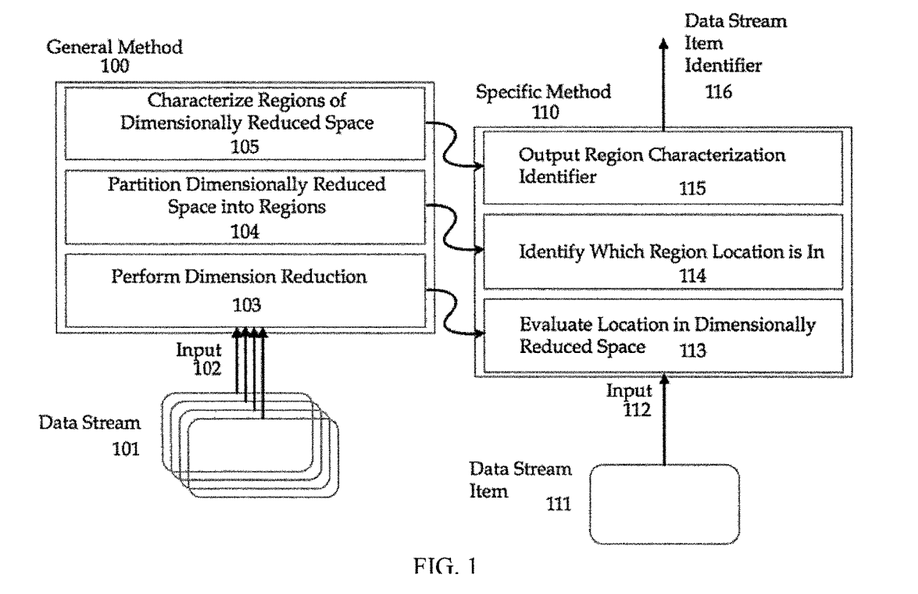
FIG. 1 is a block process diagram illustrating the General Method, and the Specific Method within a networked computing device environment according to embodiments herein.

Referring to FIG. 1, a computing device may employ the General Method 100 to characterize a data stream 101. The data stream 101 may be any electronic data stream, updated continuously or at intervals, and may be obtained from the system to be characterized by the General Method 100. In some embodiments, the data stream 101 may contain discretely delineated data, such as data records having a homogenized structure and containing values for substantially the same parameters. In other embodiments, the data stream 101 may be partially or completely unstructured, and may contain many types of data, such as electronic documents, raw text streams, internet feeds, video, audio, messages of varying formats, and the like. The computing device obtains, as input 102, one or more vectors comprising data extracted, sampled, received, or otherwise obtained from the data stream 101.

The vectors are, essentially, multi-dimensional containers for the extracted data. A variety of approaches to data extraction are possible, and can be selected to operate within any suitable performance constraints of the system. The variations among the approaches are therefore not critical to the method. It will suffice to state that the vectors obtained by data extraction contain information distinguishing the types of events, behaviors, categories, etc., that are being characterized, and such information is identified from the data stream using a suitable approach. The vectors generated by the data extraction, for purposes of employing the General Method 100, have a large number of dimensions each with values obtained from the data in the data stream.

The data may be prepared for characterization by first performing a dimension reduction on the vectors, at step 103. The dimension reduction maps each high-dimensional vector to a corresponding reduced vector having fewer dimensions and containing a modified representation of the data contained in the high-dimensional vector. The computing device thus generates a low dimensional space as a vector space containing, and defined by, the reduced vectors. In some embodiments, the dimensions of the reduced vectors are a subset of the dimensions of the high-dimensional vectors. In other embodiments, the dimensions of the reduced vectors are derived from the original dimensions, such as by generating combined-measure values having the highest variation of high-dimensional vector values across all such combined measures. Variation in normalization, measures of variation, imposed constraints, linear and non-linear representations, may be used in obtaining combined measures while performing dimensional reduction.

At step 104, the computing device may partition the low dimensional space into a plurality of regions. In some embodiments, the regions may initially be determined by grouping together subsets of the reduced vectors according to certain values of their dimensions. For example, the data might include a dimension that contains health outcomes, such as whether a person lives or dies within a period of time after the observation of health measures. The labeling of the points according to this dimension might make use of an algorithm that partitions space according to the clustering or density of those who live or die, separating regions in which a high proportion of points associated with individuals who die, from regions in which a low proportion of points associated with individuals who die. Alternatively, a dimension might include other kinds of adverse health events, with similar partitioning approaches. Alternatively, a different approach makes use of several individual dimensions. Alternatively, a different approach may make use of an automated algorithm that constructs boundaries between clusters of points according to a clustering scheme, augmented by a Voronoi space partition algorithm based upon points at the centers of those clusters, or an automated algorithm that separates core and peripheral areas of a cluster. Boundaries may be drawn between the subsets of reduced vectors, and extended out to the limits of the low dimensional space. At step 105, the identified regions may be characterized according to the common properties or characteristics of the data in the high dimensional vectors that correspond to the reduced vectors that are located in each region. A set of labels may be identified and associated with each of the regions. Other methods of characterization are described below.

Once the computing device obtains a characterization of the regions in the low dimensional space, the Specific Method 110 may be applied to characterize new data entering the data stream. The computing device obtains a data stream item 111 as a new vector input 112. At step 113, the computing device may evaluate the new vector by dimensionally reducing it to a corresponding reduced vector using the same methodology as at step 103. At step 114, the computing device may identify the region in which the new reduced vector is located, and at step 115, the computing device may output an identifier 116 indicating the region of the data stream item 111.

The General Method also exploits the characterization of types of events by use of mappings between very different types of systems. Thus, for example, social, technological or biological systems have similar types of behavior and these can be identified and characterized as part of the General Method in the process of determining domains of behavioral types. The characterization of those behavioral types enables the Specific Method to provide characterization of individual instances of behavioral types. Where appropriate, the General Method makes use of multiscale mappings between types of systems focusing on particular scales or ranges of scales.

The General Method also enables more effective use of human pattern recognition as part of the process, particularly when behavioral types are being finalized. The General Method does not require a-priori human identification of measures, but makes use of the human ability to recognize domains of behavioral types once automatically generated measures are constructed. In particular, once the low dimensional space is partitioned (step 104), the system may obtain input from a human to assist in the characterization of the resulting regions (step 105). The system may receive a label for each of the regions, the label describing the characteristics or properties of the region.

In some implementations, the partitions may be "hard" boundaries between regions: a vector located on one side of the partition is in a first region, and a vector located on another side of the partition is in a second region adjacent to the first region. In other implementations, the partitioning (step 104) may include determining a continuum between adjacent regions, which either replaces or traverses a hard boundary between the regions. The continuum may be used to assign a proportional value, in terms of labeling, to a location in the low dimensional space. For example, a vector located at an extreme edge of Region A may have a value of 1.0 or be "100% Region A," while a vector located 10 units from the edge of Region A and 90 units from the extreme edge of Region B may have a value of 0.9 or be "90% Region A, 10% Region B."

In one embodiment, the continuum may be represented by a function that maps the proportional values to the low dimensional space. The function may take the location of the vector as input and produce a proportional label based on both the partitioning (step 104) and the labeling (step 105) of the resulting regions. In another embodiment, the continuum may be represented by a transition zone that traces one or more of the hard boundaries between regions and extends a certain distance orthogonally from the boundary in one or more directions. Vectors in the low dimensional space may be associated with a single region unless they are located in the transition zone, in which case they receive, as a label, a proportional value indicative of their distance from the boundary. In another embodiment, the continuum may by projected onto the low dimensional space in measures of a discrete unit, such as a pixel.

In other implementations the labeling of categories may not be based upon partitions, but rather may itself be a continuum in which the category label is one value selected from a continuum, e.g. real numbers from 0 to 1, instead of a discrete set of partitions. The continuum category label is a linear or nonlinear function of the coordinates of the low dimensional space.

In some implementations the continuum value used as a category label may represent a probability that a vector has a particular property.

The constructed Specific Methods are particularly useful, and may be optimized, for detecting large scale events that affect the system as a whole. This approach recognizes that events that affect a small part of the system are not generally of interest to the function, health and well being of the system as a whole. In order for an adverse event to be of great importance it must typically affect more than a small part of the system. The focus is therefore on identifying the collective behaviors of the system that reflect vulnerabilities and adverse events. This is not exclusive of the possibility of detection of smaller scale events, but the approach is particularly well suited to detection of large scale events.

One embodiment of the invention constitutes a General Method for constructing Specific Methods for detecting anomalous activity in a data stream comprising: a first stage of data processing in which the data is converted to a vector of measures over time, a second stage of processing in which a trigger is used to identify an event in the data stream, a third stage of processing in which a dimensional reduction method is used to map the data within an interval of time of the trigger onto a lower dimensional space, a fourth stage of processing in which the lower dimensional space is partitioned into normal and anomalous types of activity, whereby the existence of an anomalous activity event is detected.

One embodiment of the invention constitutes a General Method for constructing Specific Methods for detecting multiple distinct types of activity in a data stream comprising: a first stage of data processing in which the data is converted to a vector of measures over time, a second stage of processing in which a dimensional reduction method is used to map the vector onto a lower dimensional space, and a third stage of processing in which the lower dimensional space is partitioned into multiple types of activity, whereby the existence of a set of types of events are detected.

One embodiment of the invention constitutes a General Method for constructing Specific Methods for detecting in a data stream a set of activity types within which the vectors are assigned a label based on a continuum of label values, the detecting comprising: a first stage of data processing in which the data is converted to a vector of measures over time, a second stage of processing in which a dimensional reduction method is used to map the data within an interval of time of the trigger onto a lower dimensional space, and a third stage of processing in which a map of correspondence is made of the lower dimensional space onto a continuum of behavioral labels of types of activity, whereby the existence of a set of types of events are detected.

The vector of measures may comprise measures of the rates of particular types of character strings, or counts of elements of audio, video or other data streams.

One embodiment of the invention is a General Method for constructing Specific Methods for performing data processing, as well as the Specific Method to perform data processing to identify the characteristics of failures, vulnerabilities, security breaches, and other adverse events, by classifying behaviors using dimensional reduction methods and partitioning the reduced dimensional space. The General Method and the Specific Methods it generates provide a generic strategy for performing failure, or sensitivity to failure, or security breach analysis.

In another embodiment of the invention, the data stream contains at least one of several types of data or metadata including but not limited to internet based server activity, computing device activity, health related indicators of an individuals, physician or hospital medical visits of multiple individuals, power transmission levels in the power grid, multiple infrastructure sensors, multiple sensors associated with an industrial process, multiple sensors connected to an urban environment, social media, telephone communications, and internet communications.

In specific embodiments of the invention the dimensional reduction may be performed using one of the large number of known dimensional reduction algorithms, including but not limited to: aggregation, correlation, multidimensional scaling, principal component analysis, Sammon map, temporal filtering, spatial filtering, transforms, clustering, projection onto a subspace, self-organizing map, multiscale analysis.

In other embodiments the method of data analysis is designed to provide characterization of categories which are not restricted to failure or other adverse events but have a larger number of attributes. Thus, several different categories of events may be identified for characterization or diagnosis of system behavior.

In one set of embodiments, the partitions of the dimensionally reduced space are determined by a data driven algorithm that partitions the dimensionally reduced space into regions. The data driven partition algorithm may include clustering, and spatial partition to correspond to the domains associated with the clusters by a growth algorithm, generalizations of Voronoi partitions, or other algorithms that partition the space into regions.

In another set of embodiments, the partitioning of the dimensionally reduced space is determined by manual input by an Expert. The Expert may, via an interface, label points in the dimensionally reduced space, or directly identify the boundaries of a region based upon visualization of the dimensionally reduced space. The Expert is an individual or individuals having experience with the system (i.e. subject matter, topics, etc.) from which the data stream is obtained so as to know relevant category labels associated with system function. The category labels may correspond to healthy individuals and individuals with specific diseases, for a medical application, and the expert a physician or other diagnostician. The category labels may correspond to stable, vulnerable or unstable systems for computing device systems, and the Expert a computing device systems operator or computing device scientist.

In a specific embodiment of the invention the Specific Method identifies the sentiment of messages among individuals or as part of social media communications.

In one embodiment of the invention use is made of information that provides labels of the events but is only present in some of the events. In this method when applied to sentiment, we identify lexicons associated with different sentiment classes, comprising, compiling the words from messages containing emoticons as labels of the representative lexicons.

Embodiments of the invention determine distinct attributes of human messages, including affective ones.

In a further embodiment the invention is a method for obtaining the sentiment associated with messages comprising: Obtaining a dataset of messages, identifying those of the messages that contain an emoticon, classifying the emoticons into at least two sentiment classes, constructing a text classifier based upon the sentiment classes for the respective messages labeled by the emoticons in each sentiment class, applying the text classifier to messages with or without emoticons, assigning sentiments according to the values obtained from the text classifiers.

In another embodiment of the method, the classified messages are aggregated and studied in space and time, or other categories, to characterize the emotional attributes of a population.

Still other embodiments include computing devices, configured to process all the method operations disclosed herein as embodiments of the invention. In such embodiments, the computing devices include a memory system, a processor, communications interface in an interconnection mechanism connecting these components. The memory system is encoded with a process that provides event detection and categorization, as explained herein that when performed (e.g. when executing) on the processor, operates as explained herein within the computing device to perform all of the method embodiments and operations explained herein as embodiments of the invention. Thus any computing device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computing device program product is one embodiment that has a computing device-readable medium including computing device program logic encoded thereon that when performed in a computing device provides associated operations providing event detection and categorization. The computing device program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computing device readable medium such as an optical medium (e.g., CD-ROM), hard disk or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computing device to cause one or more processors in the computing device to perform the techniques explained herein as embodiments of the invention. Software processes that operate in a collection of computing devices, such as in a group of data communications devices or other entities can also provide the system of the invention. The system of the invention can be distributed between many software processes on several data communications devices, or all processes could run on a small set of dedicated computing devices or on one computing device alone.

Still other arrangements of embodiments of the invention that are disclosed herein include a server system connected to a network capable of performing the method embodiment steps and operations summarized above and disclosed in detail below. More generally, a server may be one of a number of computing devices that together in a distributed fashion perform the method embodiment steps, including servers, embedded systems, personal computing devices, and mobile devices such as handheld computing devices, smart phones, and other convergent mobile devices such as iPods and iPads.

It is understood that the embodiments of the invention can be embodied strictly as a software program, as software and hardware, or as hardware and/or circuitry alone, such as within a data communications device. Note that each of the different features, techniques, configurations, etc. discussed in this disclosure can be executed independently or in combination. Accordingly, the present invention can be embodied and viewed in many different ways.

In another embodiment of the invention the system comprises a computing device readable storage medium having computing device readable code thereon for detecting and displaying anomalous activities in a data stream, the medium including instructions in which a computing device system performs operations comprising: Receiving a data stream and converting it into a vector of measures over time, mapping the vector or measures using a dimensional reduction method onto a lower dimensional space, using a criterion to partition the lower dimensional space into domains of normal and anomalous types of activity, displaying the detection of an anomalous event when it occurs.

Example Embodiment: Medical Diagnosis

Embodiments of the presently described General Method and Specific Method include the analysis of medical data as a system of diagnostic aid for physicians and healthcare systems. The Specific Method obtained from applying the General Method in this case can be a new health measure system that integrates many of the usual tests into combined measures that may better reflect health and disease. An individual's condition at a given time is represented as a point in high-dimensional space. Dimensional reduction analysis enables us to represent this high-dimensional data in a much smaller number of dimensions that best capture the variation across individuals and appointments. Where a point lies in the resultant low-dimensional space is determined by a patient's combined measure values at a given appointment.

In a preliminary reduction to practice of the invention, we find that outliers in these combined measures tend to be physiologically unstable. Their condition changes rapidly over time, an indicator that they may experience adverse events or death.

In the preliminary reduction to practice of the invention, we used data from 5,133 medical appointments across 1,711 diabetic patients (each patient having 3 appointments approximately 6 months apart) including standard measures of blood pressure, sugar, and cholesterol, weight and body mass index, kidney function, as well as height and age. We performed dimensional reduction analysis to identify the combinations of measures that best capture the variation in the population and how individual properties co-vary in conditions of health and disease across the population and over time.

Figure 2:
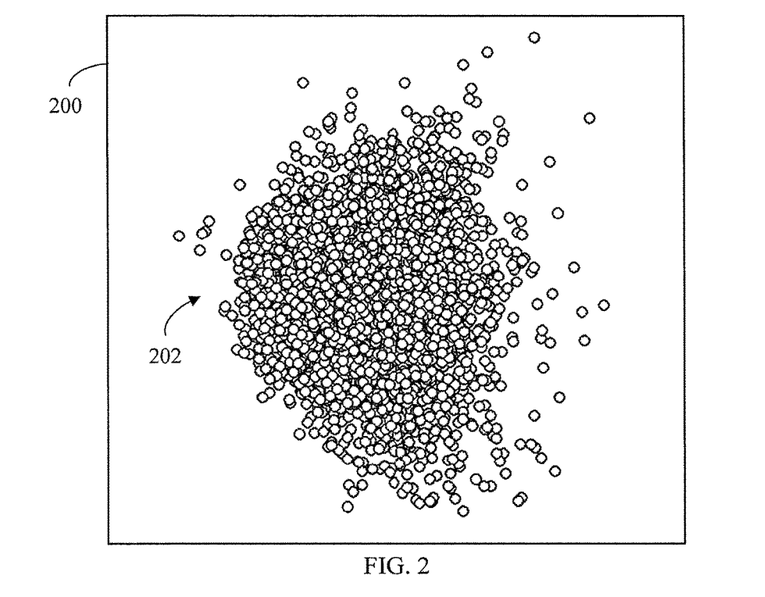
FIG. 2 is a diagram of an example dimensionally reduced mapping of high dimensional data associated with a data set of patient medical measurements onto a low dimensional space.

We visualized the population as a scatter plot in the two most informative reduced dimensions (FIG. 2). We found that individuals clustered into a single main group with outliers away from the central region that reflect specific conditions such as anomalously low blood pressure accompanied by low to normal cholesterol and sugar values (A), young adults with very high sugar and/or cholesterol levels (B), obese individuals with high blood pressure, blood sugar, and cholesterol (C), non-obese individuals with very high blood pressure and typically normal values otherwise (D), and the members of the population who have comparatively normal values overall (E).

Using data on a population enables comparing how one individual is doing with respect to others, and to identify properties of the population as a whole. Further, we can track the change in combined measures as individuals become sicker or healthier between appointments. The Specific Method results from identifying the regions of space and using those regions to inform physicians or to associate regions with specific treatment options, so as to identify individuals who require specific interventions, or changes in treatment. Events constitute those times when an individual observation at a particular time is found in a specific domain of the space.

Figure 3:
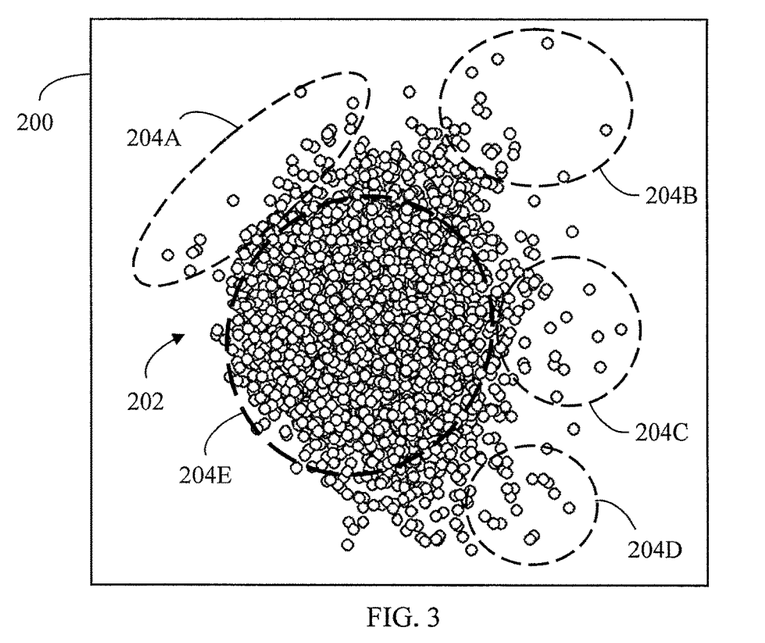
FIG. 3 is a diagram with an example of the dimensionally reduced mapping of high dimensional data of FIG. 2, with multiple groups of interesting outliers labeled.

FIG. 2 illustrates a low dimensional space 200 obtained by reducing the high-dimensional vectors for each individual to the reduced vectors represented by the combined measures as described above. The scatter plot 202 shows individuals as points in the two combined-measure dimensions that capture the most variation across the population. Referring to FIG. 3, conceptual groupings of individuals that may reflect useful combinations of health properties are identified: 204A indicates anomalously low blood pressure, accompanied by low to normal LDL and A1C values; 204B indicates young adults with very high LDL and/or A1C values; 204C indicates overweight with high blood pressure and raised LDL and A1C values; 204D indicates very high blood pressure yet normal BMI and other values; and, 204E indicates members of the population who have comparatively normal values overall.

Figure 4:
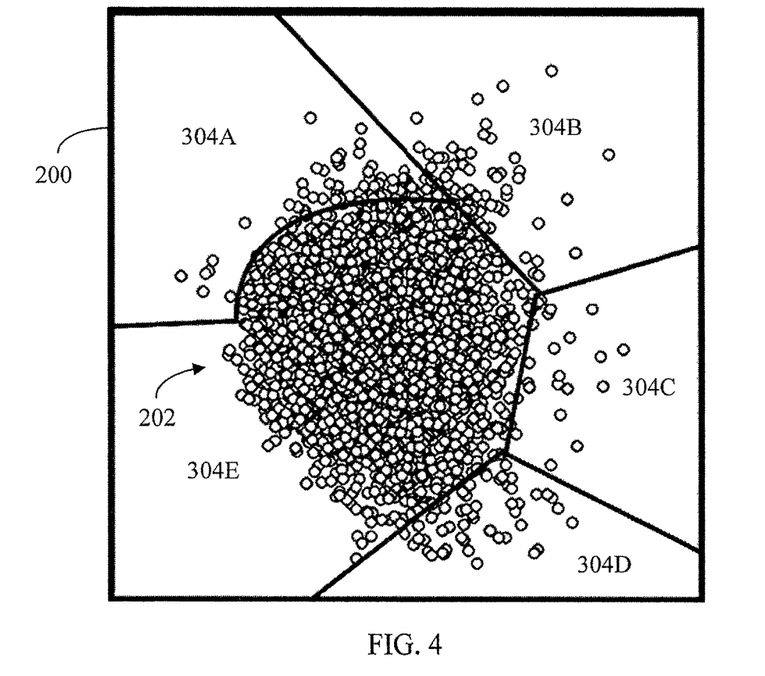
FIG. 4 is a diagram with an example of the dimensionally reduced mapping of high dimensional data of FIG. 2, and a partition of the low dimensional space into multiple regions.
Figure 5:
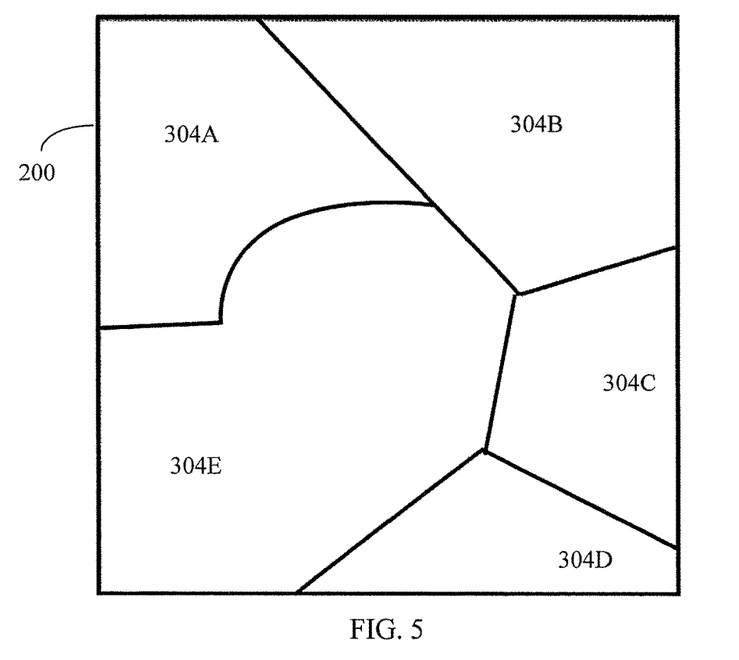
FIG. 5 is a diagram of the partitioned low dimensional space of FIG. 3 with the data removed.

Referring to FIG. 4, a partitioning function may detect these outlier groups 204A-E and partition the low dimensional space 200 into regions that each include one of the detected groups 204A-E. Particularly regarding the example, the partitioning may identify that certain combined measures of the group 204A diverge significantly from the other groups 204B-E; a partition is then drawn to create a region 304A with boundaries that best include the vectors that are more similar to the vectors of the group 204A than they are to any other group. The partitioning may be repeated to generate regions 304B-D. In the example, the group 204E contains the vectors whose combined measures are not abnormal or anomalous; thus, the region 304E may be created to include the remainder of the low dimensional space 200 that is not contained in one of the other regions 304A-D. Of note is the relative sharpness of the boundary of the region 304E at the lower left with the unpopulated region compared with the rest of the periphery. FIG. 5 then shows a potential output of the system, the low dimensional space 200 and regions 304A-E being presented without the underlying data points. New points mapped onto the low dimensional space are located in one of the regions and can be labeled by label of the region they are located in.

Another Specific Method is the identification of the dynamics of patients across appointments in the combined-measure dimensions. In the case of the analyzed data, those who are within the main cluster tend to have stable physiological states, not moving much from appointment to appointment. Those who are on the edges of the cluster tend to move rapidly and inconsistently from appointment to appointment (though one specific edge region on the lower left is associated with stability). The areas associated with rapid movement suggest that individuals found there are physiologically unstable and susceptible to adverse events and perhaps death.

In addition to identifying individuals found in instability-associated regions, taking measurements at multiple appointments and observing an individual's dynamics may also aid in identifying those at greater risk. Physiologically unstable individuals may have an appointment as they pass through a stability-associated region. Their instability would become apparent from displacement across multiple appointments.

Example Embodiment: Insurance

Embodiments of the presently described General Method and Specific Method include the analysis of insurance risks for underwriters. The quantification of risk and risk categories for individuals, corporations, and other entities, for various forms of harm, injury, accident, death, financial loss, default on debt, or other adverse events, can be considered to be determined by a large number of parameters. While traditionally indicators of risk are obtained from survey and other specific data items, interest in big data analysis of risk has led to approaches to characterize risk from other forms of data, including mobility data.

The Specific Method obtained from applying the General Method in this case can be a new insurance measure system that integrates many of the usual tests as well as new types of data into combined measures that may better reflect risk. An individual's condition at a given time is represented as a point in high-dimensional space. Dimensional reduction analysis enables us to represent this high-dimensional data in a much smaller number of dimensions that best capture the variation across individuals and appointments. Where a point lies in the resultant low-dimensional space is determined by a individual's combined measure values at a given time.

Different areas of the combined measures tend to have different levels of risk, and may be associated with different types of events. Dimensional reduction analysis is used to identify the combinations of measures that best capture the variation in the population and how individual properties co-vary in conditions of risks across the population and over time.

Historical data and human curation can be used to identify the regions of space associated with different levels of risk. Counter to the conventional approach of using correlations, the current analysis uses patterns of co-occurring variation in multiple data elements to identify risk or risk categories. Following the dynamics of the values in this space points to the existence of changes in risk associated with individuals, corporations, or other potential or insured entities.

Example Embodiment: Expert Systems

Embodiments of the presently described system include expert systems that are designed to capture the ability of human experts to identify categories of events according to their relevance to system function or categories of responses that are needed to those events.

The Specific Method obtained from applying the General Method in this case can be a system that received input data streams and outputs response warnings due to events associated with the system that is generating that data. The types of systems and associated data stream may be, but are not limited to, internet based server activity, computing device activity, health related indicators of an individuals, physician or hospital medical visits of multiple individuals, power transmission levels in the power grid, multiple infrastructure sensors, multiple sensors associated with an industrial process, multiple sensors connected to an urban environment, social media, telephone communications, internet communications.

Figure 6:
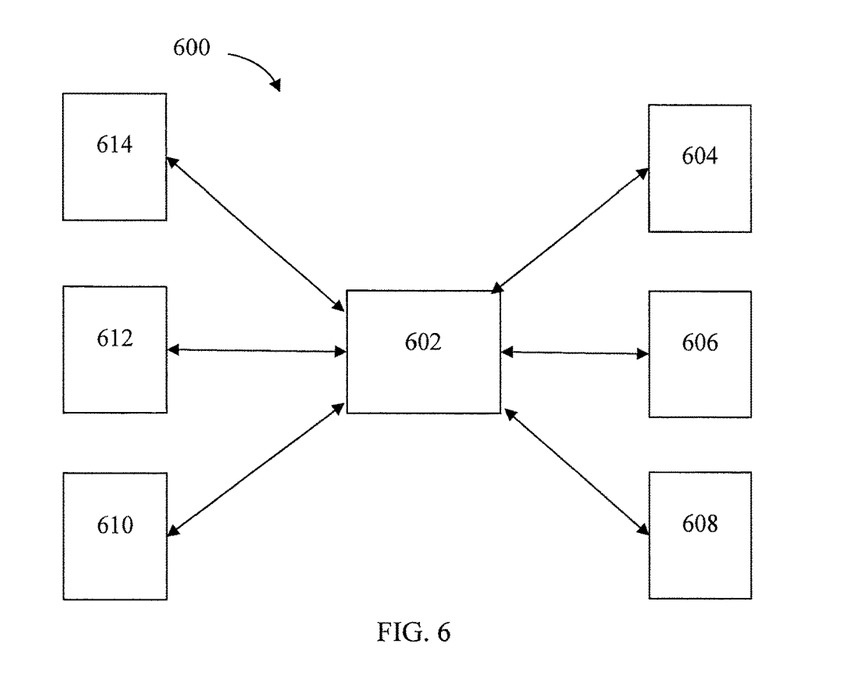
FIG. 6 is a block diagram showing the functional components of a system for partitioning a low dimensional space according to the present disclosure.

As explained above, a computerized system may implement the present invention. A computing device for the system may be a standalone computer having a processor, memory, network connection, and other computer resources as needed to perform the present methods and implement the present hardware and software devices. A computing device may additionally or alternatively be a group of computers in electronic communication with each other; the computers may be controlled by the same or a different entity. Referring to FIG. 6, a system 600 for performing the common data maintenance methods described above may include the computing device 602 and a plurality of modules for performing one or more steps of the methods. The modules may be hardware or software-based processing modules located within the computing device 602, in close physical vicinity to the computing device 602, or remove from the computing device 602 and implemented as standalone computer servers or as components of one or more additional servers. The modules may include, without limitation: a user interface module 604 for providing input/output capabilities between the system 600 and the user; a data retrieval module 606 for accessing the data stream, acquiring the vectors, or performing other data retrieval functions; a dimensional reduction module 608 for containing one or more data reduction algorithms and performing dimensional reduction of vectors; a partitioning module 610 for generating the partitions of the low dimensional space; one or more output modules 612 for generating, formatting, or otherwise preparing data to be transmitted, and then transmitting that data; and a communication module 614 for communicating with other computing devices.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

What is claimed is:

1. A system, comprising:
a computing device configured to obtain a plurality of vectors comprising data from a data stream, each of the plurality of vectors having a plurality of dimensions;
a dimensional reduction module installed on the computing device and configuring the computing device to:
generate a low dimensional space defined by a plurality of reduced dimensions determined from the plurality of vectors, there being fewer of the plurality of reduced dimensions than of the plurality of dimensions;
obtain a plurality of reduced vectors, each reduced vector of the plurality of reduced vectors:
having a corresponding vector of the plurality of vectors; and
having a plurality of values each associated with a corresponding reduced dimension of the plurality of reduced dimensions, and each obtained by applying a dimensional reduction algorithm to the data of the corresponding vector; and
using the corresponding plurality of values of each of the plurality of reduced vectors, map the plurality of reduced vectors onto the low dimensional space to produce a first mapping; and
a partitioning module installed on the computing device and configuring the computing device to:
based on the first mapping, partition the low dimensional space to produce a plurality of regions, each region being associated with a corresponding subset of a plurality of subsets of the reduced vectors;
determine, for each of the plurality of regions, from the data of the one or more vectors that correspond to the one or more reduced vectors in the corresponding subset associated with the region, a corresponding characteristic; and
associate a corresponding label, of a plurality of labels, with each of the plurality of regions, the corresponding label identifying the corresponding characteristic of the region; and
an output module installed on the computing device and configuring the computing device to:
produce a correspondence map comprising the low dimensional space, the plurality of regions, and the corresponding label of each of the plurality of regions; and
output the correspondence map.

2. The system of claim 1, wherein:
the computing device is further configured to obtain a new vector comprising new data not wholly included in the data of the plurality of vectors;
the dimensional reduction module further configures the computing device to map, with the dimensional reduction algorithm, the new vector onto a corresponding reduced new vector having a location in the low dimensional space; and
the output module further configures the computing device to:
receive a determination of the region that contains the location; and
output the label of the region that contains the location.

3. The system of claim 2, wherein:
the partitioning module further configures the computing device to:
determine that a first subset of the plurality of subsets of reduced vectors represents anomalous data in the data stream; and
label a first region of the plurality of regions, the first region being associated with the first subset of reduced vectors, as an anomalous region; and
the output module further configures the computing device to output an alert if the location is in the first region.

4. The system of claim 3, wherein:
each vector of the plurality of vectors corresponds to an individual in a population;
each dimension of the plurality of dimensions represents a corresponding health property of a plurality of health properties; and
for each reduced vector, the value of each reduced dimension is a combined measure determined from two or more of the plurality of dimensions of the corresponding vector.

5. A system, comprising a computing device that includes a processor and memory comprising instructions that, when executed by the processor, cause the system to:
obtain a mapping of a plurality of reduced vectors onto a vector space, each reduced vector comprising a dimensional reduction of a corresponding vector of a plurality of vectors, the corresponding vector containing data from a data stream;
partition, based on the mapping, the vector space to produce a plurality of regions, each region being associated with a corresponding subset of a plurality of subsets of the reduced vectors;
determine, for each of the plurality of regions, from the data of the one or more vectors that correspond to the one or more reduced vectors in the corresponding subset associated with the region, a corresponding characteristic, of a plurality of characteristics, of the data associated with each region; and
produce an output comprising the vector space and the plurality of regions.

6. The system of claim 5, wherein the instructions, when executed by the processor, further cause the system to use a pre-set algorithm to partition the vector space.

7. The system of claim 5, wherein the instructions, when executed by the processor, further cause the system to map, with a dimensional reduction algorithm, each vector to a corresponding reduced vector of the plurality of reduced vectors to generate the vector space and a set of reduced dimensions for the vector space and the plurality of reduced vectors.

8. The system of claim 7, wherein the dimensional reduction algorithm is selected from the group comprising: aggregation, correlation, multidimensional scaling, principal component analysis, Sammon map, clustering, projection onto a subspace, self-organizing map, and multiscale analysis.

9. The system of claim 5, wherein the instructions, when executed by the processor, further cause the system to:
   associate a corresponding label, of a plurality of labels, with each of the plurality of regions, the corresponding label identifying the corresponding characteristic of the region; and
   produce the output further comprising the corresponding label of each of the plurality of regions.

10. The system of claim 9, wherein at least one of the plurality of regions is labeled normal and at least one of the plurality of regions is labeled anomalous.

11. The system of claim 10, wherein the data stream comprises activity of a monitored computing device, and wherein the one or more regions labeled anomalous correspond to a security breach of the monitored computing device.

12. The system of claim 9, wherein the label of each of the plurality of regions identifies a corresponding behavior of a set of behaviors.

13. The system of claim 9, wherein the label of each of the plurality of regions is provided by an expert of a topic of the data in the data stream.

14. The system of claim 5, wherein the instructions, when executed by the processor further cause the system to:
   generate an interface accessible by a user device in electronic communication with the computing device; and
   receive a label of each region of the plurality of regions from the user device via the interface.

15. The system of claim 14, wherein the instructions, when executed by the processor, further cause the system to, before receiving the label of each region, transmit the output to the user device and cause the interface to display, on the user device, the vector space showing the plurality of regions.

16. The system of claim 5, wherein the instructions, when executed by the processor, further cause the system to:
   obtain a new vector comprising new data that entered the data stream subsequent to the system obtaining the plurality of vectors;
   map, with a dimensional reduction algorithm, the new vector onto a corresponding reduced new vector having a location in the low dimensional space; and
   determine the region that contains the location.

17. The system of claim 5, wherein the instructions, when executed by the processor, further cause the system to map a continuum of values onto the vector space, the continuum setting a corresponding value at each location of part of the vector space, the corresponding value being determined by the location.

18. A method for analyzing a data stream, the method comprising:
   obtaining a plurality of vectors comprising data from the data stream, each of the plurality of vectors having a plurality of dimensions;
   mapping, with a dimensional reduction algorithm, each vector of the plurality of vectors onto a corresponding reduced vector of a plurality of reduced vectors in a low dimensional space, the low dimensional space having a plurality of reduced dimensions numbering fewer than the plurality of dimensions;
   partitioning, based at least in part on a corresponding location, within the low dimensional space, of each of the plurality of reduced vectors, the low dimensional space to produce a plurality of regions, each region being associated with a corresponding subset of a plurality of subsets of the reduced vectors;
   determining, for each of the plurality of regions, from the data of the one or more vectors that correspond to the one or more reduced vectors in the corresponding subset associated with the region, a corresponding characteristic; and
   associating a corresponding label, of a plurality of labels, with each of the plurality of regions in the low dimensional space; and
   producing a correspondence map representing characteristics of the data in the data stream and comprising the low dimensional space, the plurality of regions, and the corresponding label of each of the plurality of regions.

19. The method of claim 18, further comprising:
   obtaining a new vector comprising new data from the data stream;
   mapping, with the dimensional reduction algorithm, the new vector onto a corresponding reduced new vector having a location in the low dimensional space;
   determining the region that contains the location; and
   outputting the label of the region that contains the location.

20. The method of claim 19, further comprising identifying an event in the data stream, and wherein the new data entered the data stream within an interval of time of the event.

* * * * *